May 8, 1962  R. G. LE TOURNEAU  3,033,524
TREE FILLING MACHINE
Filed Dec. 10, 1959  2 Sheets-Sheet 1
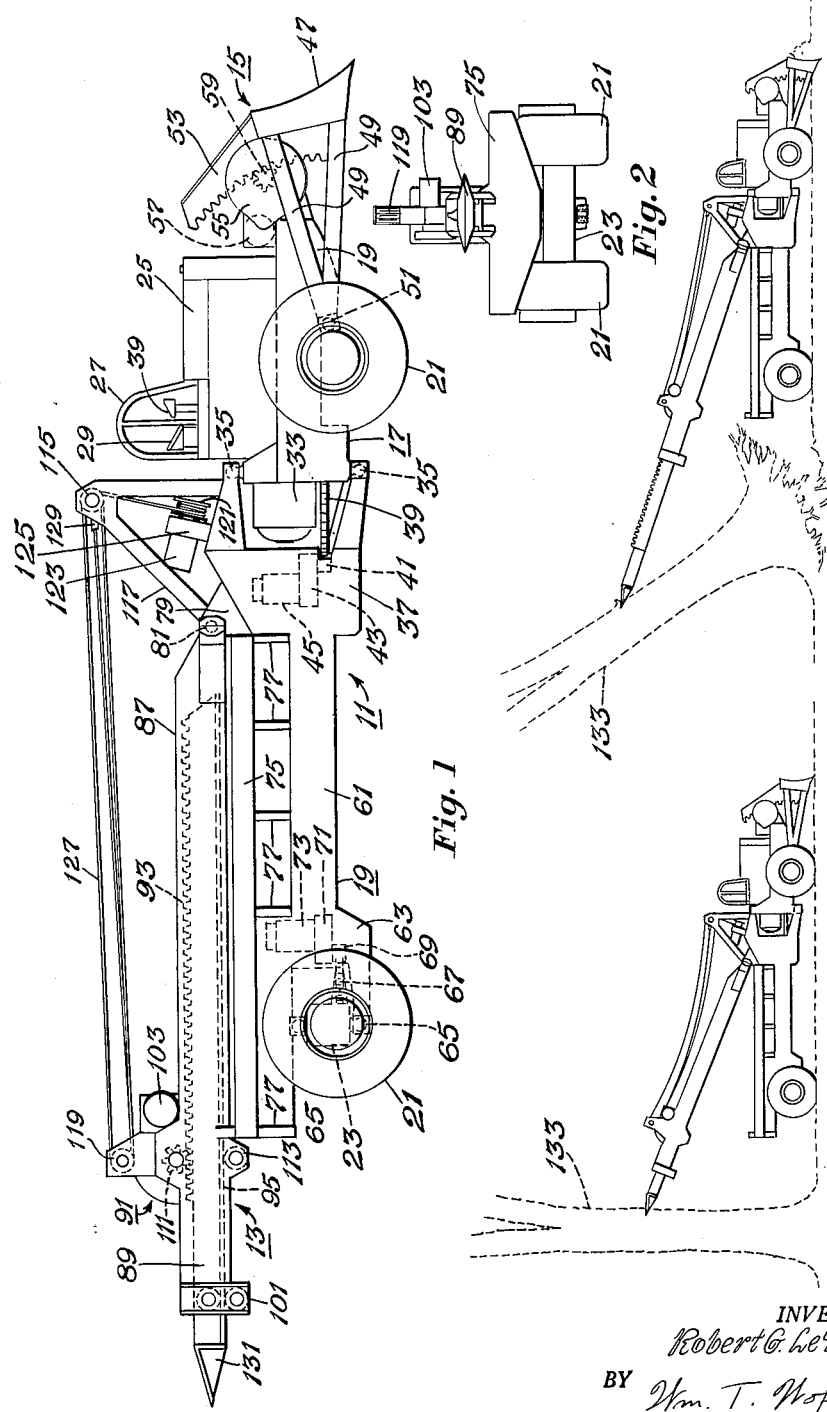
INVENTOR.
Robert G. LeTourneau
BY Wm. T. Wofford
Attorney May 8, 1962 R. G. LE TOURNEAU 3,033,524
TREE FILLING MACHINE
Filed Dec. 10, 1959 2 Sheets-Sheet 2
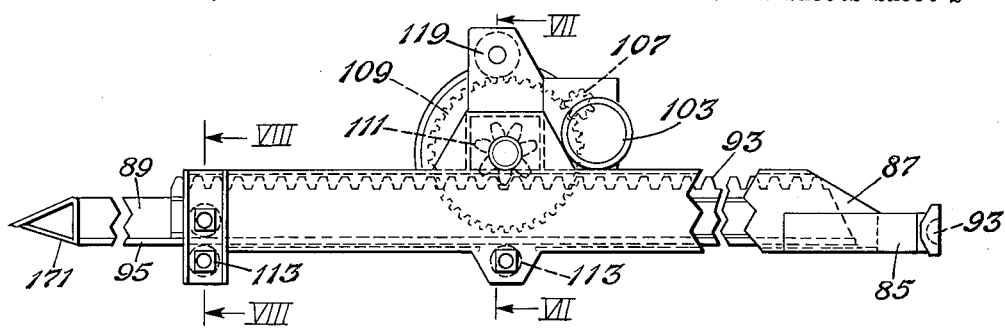
*Fig. 5*
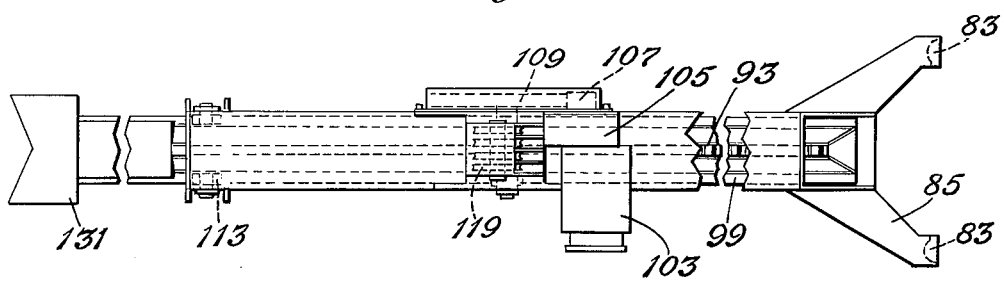
*Fig. 6*
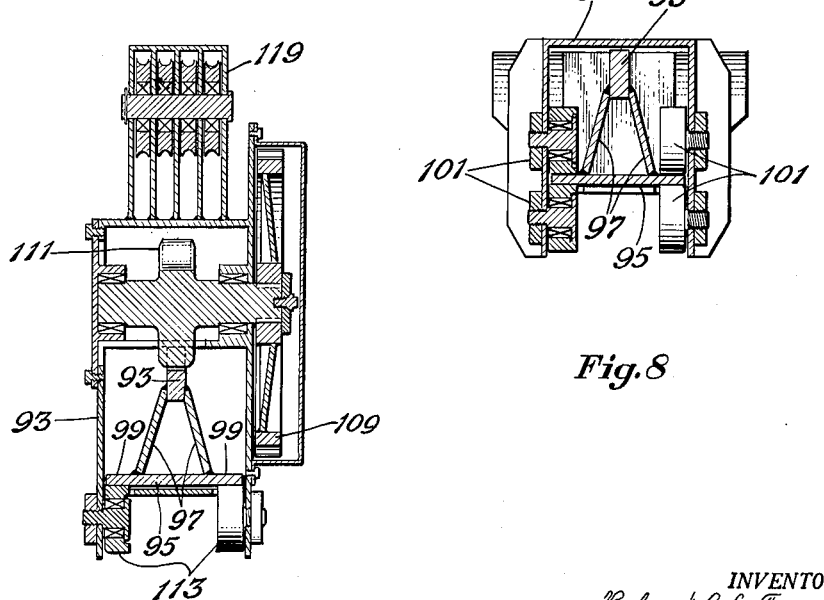
*Fig. 7*
*Fig. 8*
INVENTOR.
Robert G. LeTourneau
BY Wm. T. Wofford
Attorney United States Patent Office 3,033,524
Patented May 8, 1962

3,033,524
TREE FELLING MACHINE
Robert G. LeTourneau, P.O. Box 2307, Longview, Tex.
Filed Dec. 10, 1959, Ser. No. 858,696
4 Claims. (Cl. 254—95)

My invention relates to land clearing machinery and more particularly to machinery adapted for felling trees by exerting force on their trunks.

The machine which is subject of the present invention represents improvements over the tree felling machine disclosed in my U.S. Patent No. 2,885,799 issued May 12, 1959.

Thus, the general object of my invention is to provide an improved tree felling machine.

Another object of my invention is to provide a tree felling machine having increased effectiveness.

Another object of my invention is to provide a tree felling machine having increased versatility.

These and other objects are effected by my invention as will be apparent from the following description, taken in accordance with the accompanying drawings, in which:

FIG. 1 is a schematic side elevational view of the tree felling machine in accordance with a preferred embodiment of my invention;

FIG. 2 is a rear end elevational view of the machine shown by FIG. 1;

FIGS. 3 and 4 are side elevational views illustrating the tree felling operation of the machine;

FIG. 5 is an enlarged side elevational view, partly broken away, showing the machine pusher boom assembly;

FIG. 6 is a plan view of the pusher boom assembly;

FIG. 7 is an enlarged section view taken at lines VII—VII of FIG. 5; and

FIG. 8 is an enlarged section view taken at lines VIII—VIII of FIG. 5.

The improved tree felling machine in accordance with a preferred embodiment of my invention comprises a wheeled vehicle 11 carrying an extensible and retractable pusher boom assembly 13 and a ground engaging brace or anchor assembly 15.

The vehicle 11 comprises a front frame assembly 17, a rear frame assembly 19, wheels 21, wheel drive assemblies (not shown), a rear axle 23, a front axle (not shown), power plant 25, cab 27, operator's seat 29, and control station 39. The front frame assembly 17 includes a bed 19 fabricated of formed heavy steel plate material welded to form a hollow reinforced integral unit. The bed interior serves as a fuel tank, and a depression on its top side receives the power unit 25. The power unit 25 is an internal combustion engine driving an electric generator 33. The generator supplies power to the various electric motors which in turn power the various machine functions. The front and rear axles are of hollow tubular construction and are provided with bolt flanges (not shown) at their ends for mounting electric wheel drive assemblies. The front axle is mounted to rock about a transverse horizontal axis by means of a ball and socket pivot arrangement (not shown) which is fixed to the underside of the front frame bed 19 at its longitudinal center portion. Fixed at the center rear of the front frame bed are a pair of outwardly extending oppositely disposed balls 35 which are adopted for cooperation with sockets carried by the front steering yoke 37 of the rear fame assembly 19. Rigidly fixed to and centrally disposed on the rear end of the front frame bed and extending rearwardly therefrom is a steering sector gear 39 which engages the output pinion 41 of a gear reduction 43 driven by the front steering motor 45, the gear reduction and steering motor being mounted within the front steering yoke structure 37 of the rear frame assembly 19.

The ground engaging brace or anchor assembly 15 includes a large upstanding blade member 47 extending over most of the vehicle width. The blade is rigidly supported at each rear end portion by a set of suitable bracing members 49 which terminate in a socket adapted to be received by a respective ball 51 which is fixed to the side of the front frame bed 17 just forward of the front axle. Thus the blade 47 is mounted for pivoting motion about a transverse horizontal axis which passes through the centers of the balls 51. Fixed upright to the rear side of the blade is a curved gear segment 53 the radius of curvature is such that each tooth is equi-distant from the blade pivot axis. Mounted on the front of the front frame bed is a gear reduction 55 driven by an electric motor 57 and having an output pinion 59 engaging said gear segment 53.

The vehicle rear frame assembly 19 includes a main member 61 of conventional box beam construction which is integral at its forward end with the front steering yoke structure 37, and is integral at its rear end with a rear steering yoke structure 63. The rear steering yoke structure includes a pair of oppositely disposed sockets at its transverse center adapted for receiving balls 65 which are fixed to the center of the rear axle 23 so that the rear axle is pivoted about a vertical axis. A steering sector gear 67 is rigidly fixed to the front side of the rear axle 23 at its transverse center portion and extends forwardly therefrom to engage the output pinion 69 of a gear reduction 71 which is mounted on the rear steering yoke 63 and is driven by an electric motor 73. The vehicle rear frame assembly carries a flat bed 75 which is supported by transverse cross members 77 which are fixed to said frame assembly 19.

A boom pivot support structure 79 is built up on the upper rear side of the front steering yoke 37, which structure carries oppositely disposed balls 81 adapted for receiving sockets 83 carried by yoke structure 85 fixed to the forward end of the boom housing 87, for pivoting the boom about a transverse horizontal axis.

The pusher boom assembly 13 includes an extensible portion 89 which is carried for reciprocable motion within the boom sleeve or housing 87, and a boom drive assembly 91. The sleeve or housing 87 is a hollow box beam of rectangular transverse cross section, closed at its forward end and mounting said pivot yoke 85 at its forward end portion. The boom extensible portion 89 includes a rack 93 and a rack guide 95. The rack guide 95 is a rectangular strip of heavy metal plate material. The rack 93 (see FIG. 7) is rigidly held in fixed spaced relation to the rack guide 95 and so that the rack face is bisected by a plane which is a longitudinal perpendicular bisector of the rack guide by a pair of web members 97 which are welded at one of their longitudinal edges to the respective rack sides and diverge outwardly therefrom and are welded at their other respective longitudinal edges to one face of said guide 95, equidistant from the guide longitudinal edges. The portions of the guide extending outwardly beyond the webs form guide flanges 99. A set of guide rollers 101 (see FIG. 8) are mounted at the rear end of said boom sleeve portion 87, with pairs of rollers engaging on opposite sides of each rack guide flange 99. Fixed to the pusher boom housing 87 near its outer end is the boom drive assembly 91 which comprises a gear reduction driven by an electric motor 103. The motor drives a first portion 105 of the gear reduction which has an output pinion 107 engaging a bull gear 109 which in turn drives an output pinion 111 which engages the rack 93 (see FIG. 7). Fixed to the lower side of the boom housing 87 opposite the pinion 111 which drives the rack 93 are a pair of back-up rolls 113 which engage the underside of the rack guide flanges 99. Thus, the extensible portion 89 of the pusher boom assembly 13 is supported for reciprocable movement by the guide rollers 101 at the boom housing 87 rear end and by the rack drive pinion 111 and the back-up rolls 113 which are associated with it. A set of front boom elevating sheaves 115 is supported above the vehicle front steering yoke structure 37 by means of suitable brace members forming a short tower 117. A set of rear boom elevating sheaves 119 is fixed to the upper side of the boom drive gear reduction. A boom elevator winch 121 driven by an electric motor 123 through a gear reduction 125 is mounted on the vehicle front steering yoke 37 beneath the front sheave set 115. Cable 127 is reeved off the winch drum, through the sheave sets 115, 119, and deadended at 129 on the front sheave set support tower 117. Fixed to the end of the extensible portion 89 of the boom assembly 13 and forming a rigid extension thereof is a stinger 131, which is adapted to engage the tree to be felled without excessive lateral or upward slippage.

All of the electric motors associated with the machine are equipped with electromagnetic friction brakes which are automatically released when the respective motor is energized and engaged when the respective motor is deenergized. All machine functions are controlled by means of toggle buttons at the control station 39 which control solenoids to actuate the various electric contactors in the motor circuits.

The operation of the machine in felling a tree is illustrated by FIGS. 3 and 4 of the drawings. The vehicle 11 is maneuvered into position near the tree 133 in line with the desired felling direction. The ground engaging brace 15 is then powered downwardly into firm engagement with the ground, and the boom 13 is raised to the desired angle and extended into contact with the tree. As the boom pushes on the tree the brace is forced into the ground until it has picked up sufficient load to counteract the force required to fell the tree, and then the further extension of the boom pushes the tree over. It should be noted that the line of action (force) of the boom (its longitudinal axis) very nearly coincides with the line of reaction of the brace (a line through the brace blade 47 lower edge and its pivots) so that a negligible force couple results from the boom action force and the brace reaction force. This is a definite advantage since it reduces any tendency for misalignment of the action and reaction forces, and requires that only a relatively small portion of the vehicle be stressed to withstand the action and reaction forces.

Another advantage of the improved arrangement disclosed herein is that it makes for a versatile machine. With the pusher boom assembly 13 pivoted at the front of the vehicle bed 75 and extending rearwardly, it can readily rest on the bed when retracted, without undue interference with other functions of the vehicle. With the boom resting in its retracted position, the vehicle can be used effectively as a transporter. Also, the brace blade, being at the front of the vehicle can be readily used as land clearing or pioneering tool.

While I have shown my invention in only one form, it will be apparent to those skilled in the art that it is not so limited, but is susceptible of various changes and modifications without departing from the spirit thereof.

I claim:

1. A self-propelled mobile tree felling machine comprising a body supported by front and rear wheel groups at least one of which is steerable and at least one of which is power driven, a power driven extensible and retractable boom pivotally mounted above and rearward of said front wheel groups for swinging movement in a vertical plane and extending longitudinally and rearwardly of said body for pushing against a tree to be felled, power operated means for controlling movement of said boom in a vertical plane, a ground engaging brace mounted at the front end of said body, said brace comprising an upstanding blade extending transversely of said body, a blade support structure extending rearwardly therefrom, means pivoting said support structure adjacent said front wheel group for swinging movement in a vertical plane from raised position to a ground engaging position beyond the end of said body, power driven means for raising and lowering said blade, said power driven means including means for holding said structure against pivoting movement except when said blade is being raised or lowered, said boom pivots and said brace pivots being relatively disposed so that when the machine boom and brace are in normal tree felling position the line of action of boom force and the line of reaction of brace force do not produce a significant force couple.

2. A self-propelled mobile tree felling machine comprising a body supported by front and rear wheel groups at least one of which is steerable and at least one of which is power driven, a power driven extensible and retractable boom pivotally mounted near the front of said body for swinging movement in a vertical plane and extending rearwardly of said body for pushing against a tree to be felled, power operated means for controlling movement of said boom in a vertical plane, a ground engaging brace mounted at the front end of said body, said brace comprising a ground engaging portion extending transversely of said body, a support structure extending rearwardly from said ground engaging portion, means pivoting said support structure at one end to said body so that said brace may swing in a vertical plane from raised position to a ground engaging position beyond the end of said body, power driven means for raising and lowering said brace, said power driven means including means for holding said support structure against pivoting movement except when said brace is being raised or lowered, said boom and brace pivots being relatively disposed so that when the machine boom and brace are in normal tree felling position, the force axes of said boom and brace are substantially aligned.

3. A self-propelled mobile tree felling machine comprising a body supported by front and rear wheel groups at least one of which is steerable and at least one of which is power driven, a ground engaging brace mounted at the front end of said body, said brace comprising a ground engaging portion and a support structure extending rearwardly from said ground engaging portion, means pivoting said support structure at one end to said body adjacent said front wheel group so that said brace may swing in a vertical plane from raised position to a ground engaging position beyond the end of said body, power driven means for raising and lowering said brace, said power driven means including means for holding said support structure against pivoting movement except when said brace is being raised or lowered, a power driven extensible and retractable boom pivotally mounted above and rearwardly of said brace pivots for swinging movement in a vertical plane and extending rearwardly of said body for pushing against a tree to be felled, power operated means for controlling movement of said boom in a vertical plane, said boom and brace pivots being relatively disposed so that when the machine boom and brace are in normal tree felling position, the brace ground engaging portion, said pivots, and the outer end of said boom are approximately aligned.

4. A self-propelled mobile tree felling machine comprising a body supported by front and rear wheel groups at least one of which is steerable and at least one of which is power driven, a ground engaging brace mounted at the front end of said body, said brace comprising a ground engaging portion and a support structure extending rearwardly from said ground engaging portion, means pivoting said support structure at one end to said body adjacent said front wheel group so that said brace may swing in a vertical plane from raised position to a ground engaging position beyond the end of said body, power driven means for raising and lowering said brace, said power driven means including means for holding said support structure against pivoting movement except when said brace is being raised or lowered, a power driven extensible and retractable boom pivotally mounted above and rearwardly of said brace pivots for swinging movement in a vertical plane and extending rearwardly of said body for pushing against a tree to be felled, power operated means for controlling movement of said boom in a vertical plane, said boom and brace pivots being relatively disposed so that when the machine boom and brace are in normal tree felling position, the brace ground engaging portion, said pivots, and the outer end of said boom are approximately aligned and means for supporting said boom to rest it in lowered position on said body when not in use.

References Cited in the file of this patent

UNITED STATES PATENTS

| | | |
|---|---|---|
| 1,049,697 | Gee | Jan. 7, 1913 |
| 2,229,521 | Pinkham | Jan. 21, 1941 |
| 2,436,510 | Ferguson | Feb. 24, 1948 |
| 2,663,952 | Winget | Dec. 29, 1953 |
| 2,787,298 | LeTourneau | Apr. 2, 1957 |
| 2,858,626 | Toulmin | Nov. 4, 1958 |
| 2,883,775 | De Hardit | Apr. 28, 1959 |
| 2,885,799 | LeTourneau | May 12, 1959 |

FOREIGN PATENTS

| | | |
|---|---|---|
| 320,245 | France | Aug. 13, 1902 |
| 324,506 | France | Dec. 13, 1902 |